United States Patent
Raiser

[11] Patent Number: 5,883,472
[45] Date of Patent: Mar. 16, 1999

[54] CIRCUIT FOR OPERATING A DISCHARGE LAMP

[75] Inventor: Franz Raiser, Munich, Germany

[73] Assignee: Patent-Treuhand-Gesellschaft fuer elektrische Gluehlampen mbH, Munich, Germany

[21] Appl. No.: 894,053
[22] PCT Filed: Feb. 8, 1996
[86] PCT No.: PCT/DE96/00198
§ 371 Date: Aug. 12, 1997
§ 102(e) Date: Aug. 12, 1997
[87] PCT Pub. No.: WO96/25833
PCT Pub. Date: Aug. 27, 1996

[30] Foreign Application Priority Data

Feb. 17, 1995 [DE] Germany .................. 195 05 459.8

[51] Int. Cl.$^6$ .................................................. H05B 41/29
[52] U.S. Cl. ................... 315/225; 315/209 R; 315/307; 315/205
[58] Field of Search .................. 315/225, 205, 315/DIG. 7, 209 R, 224, 307

[56] References Cited

U.S. PATENT DOCUMENTS 4,554,487  11/1985  Nilssen ................................ 315/224

FOREIGN PATENT DOCUMENTS 0648068   4/1995  European Pat. Off. .
3626209   2/1988  Germany .
94 06262  3/1994  WIPO .

*Primary Examiner*—Arnold Kinkead
*Attorney, Agent, or Firm*—Carlo S. Bessone

[57] ABSTRACT

The invention concerns a circuit for operating a discharge lamp with a half-bridge generator (T1, T2) wherein a turn-off transistor (T3) can stop the half-bridge generator The energy source for the base current of the turn-off transistor (T3) is formed by starter capacitor (C3) which starts the half-bridge generator (T1, T2), In addition, the collector-emitter section of the turn-off transistor (T3) is directly between the base of the lower transistor (T2) of the half-bridge generator and earth.

2 Claims, 3 Drawing Sheets

000
CIRCUIT FOR OPERATING A DISCHARGE LAMP

BACKGROUND OF THE INVENTION

The invention concerns a circuit arrangement for the operation of a discharge lamp.

In the operation and upon ignition of a discharge lamp, high voltages can occur in a defective lamp and towards the end of a lamp's service life, which can lead to destruction of the corresponding electronic ballast if no suitable countermeasures have been provided. Customarily, a cutoff circuit is used to monitor lamp voltage. As soon as lamp voltage has been higher than a particular value for longer than a predetermined time, the cutoff intervenes and the lamp generator, which is generally a half bridge generator, is stopped.

Electronic ballasts with a cutoff circuit from the OSRAM GmbH company (product designation QT EC) are already known. A circuit arrangement corresponding to this state of the art is shown in FIG. 1. In this arrangement, the cutoff device is formed from a bistable flip-flop circuit consisting of two transistors T1 and T2 (thyristor equivalent circuit). The lamp voltage $U_L$ is fed via a voltage divider R4, R3 and a time-lag device R4, Ct to the base of one of the transistors of the bistable flip-flop circuit, which forms the trigger input of this circuit. When the bistable flip-flop circuit trips to its conducting or operation state, a cutoff transistor T3 stops the lamp generator, which is a half bridge generator in the example described, by suppressing the base drive of the lower transistor Tu of the half bridge generator via a diode D1. A starting capacitor Cs, which is located parallel to the switching path of the lower transistor Tu of the half bridge generator via a diode D4, is short-circuited via a diode D2 so that renewed starting attempts by the inverse rectifier are prevented.

This known circuit has two disadvantages in particular. In order that the oscillation of the half bridge generator can be dependably interrupted, the base of transistor Tu of the half bridge circuit must be connected with low impedance to ground. However, since the base voltage of transistor Tu of the half bridge generator can also show negative values, the base of this transistor Tu of the half bridge generator is connected via a diode D1 to the collector of the cutoff transistor T3. In this way, however, dependable disconnection is made more difficult, since the base of the lower transistor Tu is not directly connected to ground upon disconnection, but only via the diode path from D1 via T3.

A further disadvantage of the known circuit arrangement is that an energy source $U_v$ must be made available to provide the base current for the cutoff transistor T3. In known circuit arrangements, an electrolytic capacitor is provided for this purpose, which is loaded either using the trigger signal or via a pump circuit.

Therefore, the purpose of the present invention is to make a circuit arrangement available for the operation of a discharge lamp, in which the aforementioned problems are avoided.

SUMMARY OF THE INVENTION

The invention as shown in FIGS. 2 and 3 concerns a circuit for operating a discharge lamp with a half-bridge generator. The energy source for the base current of a turn-off transistor (T3) is formed by starter capacitor (C3) which starts the half-bridge generator. The realization of the circuit arrangement according to invention according (FIG. 2) has the advantage that no additional source of energy is required for the cutoff process, but rather that this energy source is provided by the already present starting capacitor C3. In the previously mentioned known circuit, the starting capacitor is discharged when the half bridge generator is in operation, via a diode D4 which is located parallel to the switching path of transistor T2 of the half bridge generator.

By insertion of a Zener diode D9, the starting capacitor C3 remains loaded at the value of the Zener voltage of the Zener diode and is used in this way as an energy source. If the bistable flip-flop circuit T5, T4 becomes conductive, not only is the lamp generator stopped, but a restart by discharge of the starting capacitor is also prevented.

The preferred circuit arrangement has the advantage that dependable disconnection is guaranteed, since the collector-emitter path of cutoff transistor T3 is located directly between the base of transistor T2 of the half bridge generator and ground. By using a diode D12 between the collector of transistor T5 and the base of transistor T4, which forms the trigger input of the bistable flip-flop circuit, negative collector currents in the cutoff transistor T3 are prevented when negative base voltages are present in transistor T2 of the half bridge generator. Furthermore, an additional diode D11 can be provided for voltage matching of the base terminals of transistor T4, which forms the trigger input of the bistable flip-flop circuit, and the cutoff transistor T3.

A current supply for illuminated displays, which contains a single-transistor combinational circuit component, is known from WO-A-94/06262. Circuit arrangements for discharge lamps are described in the documents U.S. Pat. No. 4,554,487 and DE-A-36 26 209, which each show a half bridge generator and a cutoff transistor. Triggering of the cutoff transistor is performed here using a diac.

In addition, a circuit arrangement for the operation of electric lamps is described in EP-A-0 648 068, in which the half bridge generator can be stopped using a field effect transistor. Drive of the field effect transistor takes place here using a bistable multivibrator.

Additional advantages, elements, and possible applications of the invention arise from the following description of a sample execution of the invention in connection with the drawing.

BEST MODE FOR CARRYING OUT THE INVENTION

Figure 2:
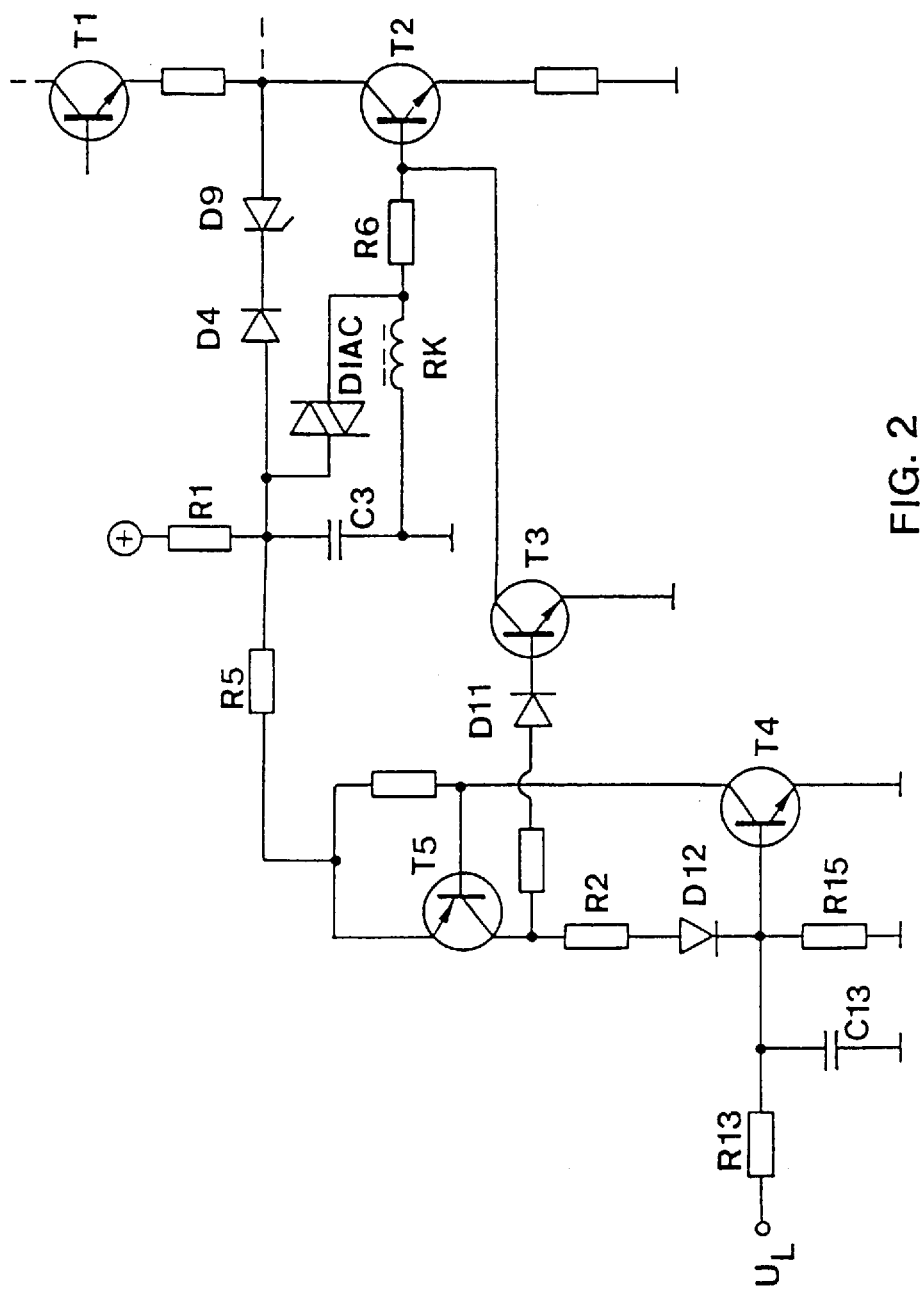
FIG. 2 shows an initial sample execution of a circuit arrangement according to invention.

FIG. 2 shows a circuit arrangement for the operation of a discharge lamp with a half bridge generator, which is formed from a lower transistor T2 and an upper transistor T1. A load circuit with a discharge lamp E (not shown in FIG. 2) is located parallel to transistor T2. The lamp voltage U2 is fed via a voltage divider R13, R15 and a time-lag device R13, C13 to the base of a transistor T4, which forms the trigger input of a bistable flip-flop circuit from a first and second transistor T4 and T5, respectively. When the flip-flop circuit is in a conductive state, a cutoff transistor T3 stops the half bridge generator by suppressing the base drive of transistor T2.

The starting capacitor C3 is located parallel to the switching path of transistor T2 and in series with diode D4 and Zener diode D9. The starting capacitor C3 is loaded by this Zener diode D9 to the value of the Zener voltage and can thus serve as an energy source for the base current of cutoff transistor T3.

In order to start the half bridge generator T1, T2, the starting capacitor C3 is loaded via resistor R1 until it reaches the breakdown voltage of a diac DIAC. A base current of the half bridge transistor T2 flows via the diac DIAC. In this way, the transistor T2 is switched into the conductive state, so that a load current flows into the load circuit C10, C11, R8 in FIG. 3 of the discharge lamp E. A coil (RK1-A in FIG. 3) in the load current is coupled to a coil Rk (RK1-C in FIG. 3), which is inserted between resistor R6 connected in series to the base of transistor T2 and ground. In this way, a self-maintaining oscillation of the half bridge generator is triggered. Following stimulation of oscillation in the generator, C3 is loaded to the Zener voltage of D9.

In addition, a diode D11 can be provided at the base of transistor T3 for voltage matching of the base terminals of transistors T4 and T3, as well as a diode D12 between the collector of the second transistor T5 and the base of the first transistor T4 in a circuit arrangement for the operation of a discharge lamp.

Figure 1:
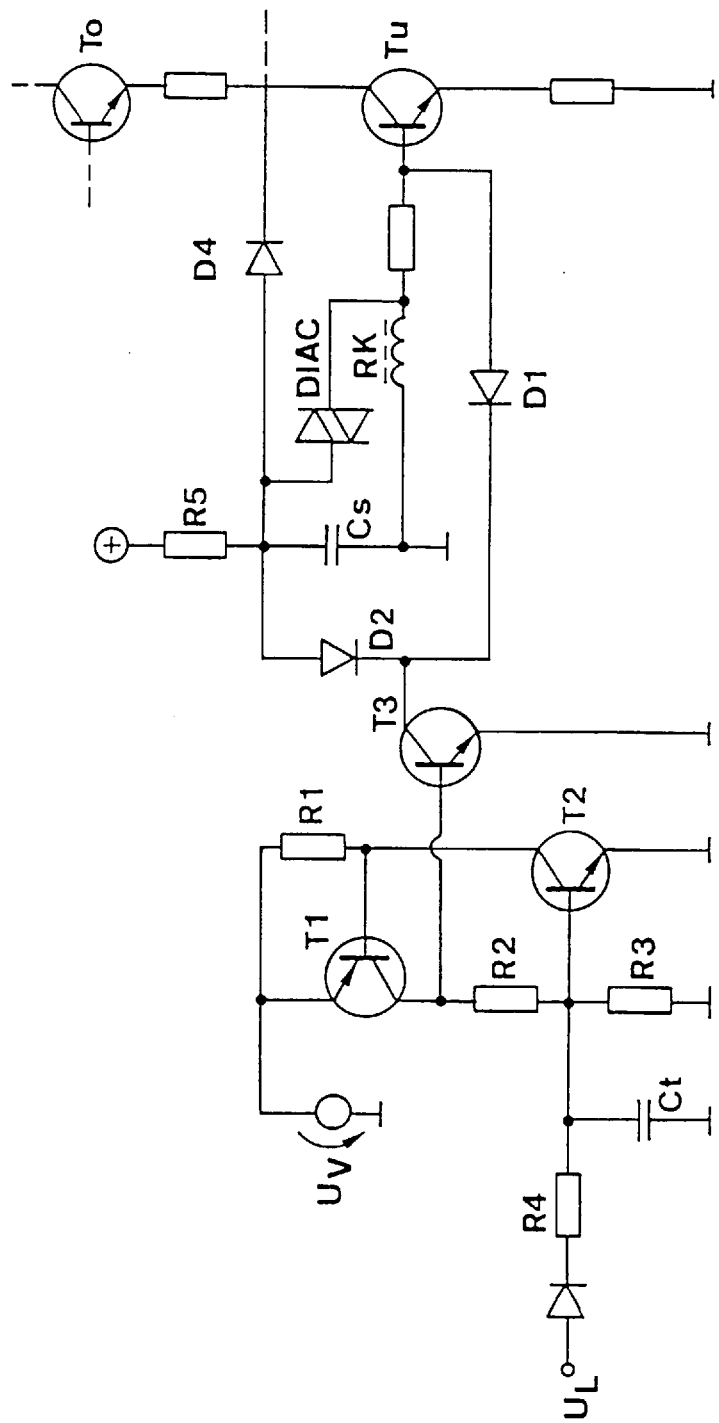
FIG. 1 shows a circuit arrangement according to the state of the art.

While a diode D1 is provided for in the circuit according to FIG. 1, which serves to prevent a discharge of Ct via the base-collector path of T3 upon negative base-emitter voltage of transistor Tu, the circuit according to invention according to FIG. 2 provides that this diode is omitted. In the circuit according to invention according to FIG. 2, discharge of C13 is prevented by diode D12. In this way, it becomes possible to connect the collector of cutoff transistor T3 directly to the base of half bridge transistor T2, so that in case of cutoff, the base of T2 will be connected to ground at a lower impedance (without voltage drop at diode D1 provided for according to FIG. 1).

D11 serves to ensure that a sufficiently large drive current is available for T4, so that the entire collector current of T5 does not discharge into the base of T3.

In this preferred sample execution, two circuit arrangements are realized in order to solve the aforementioned problems in a circuit. However, they can also easily be used independently of one another.

Figure 3:
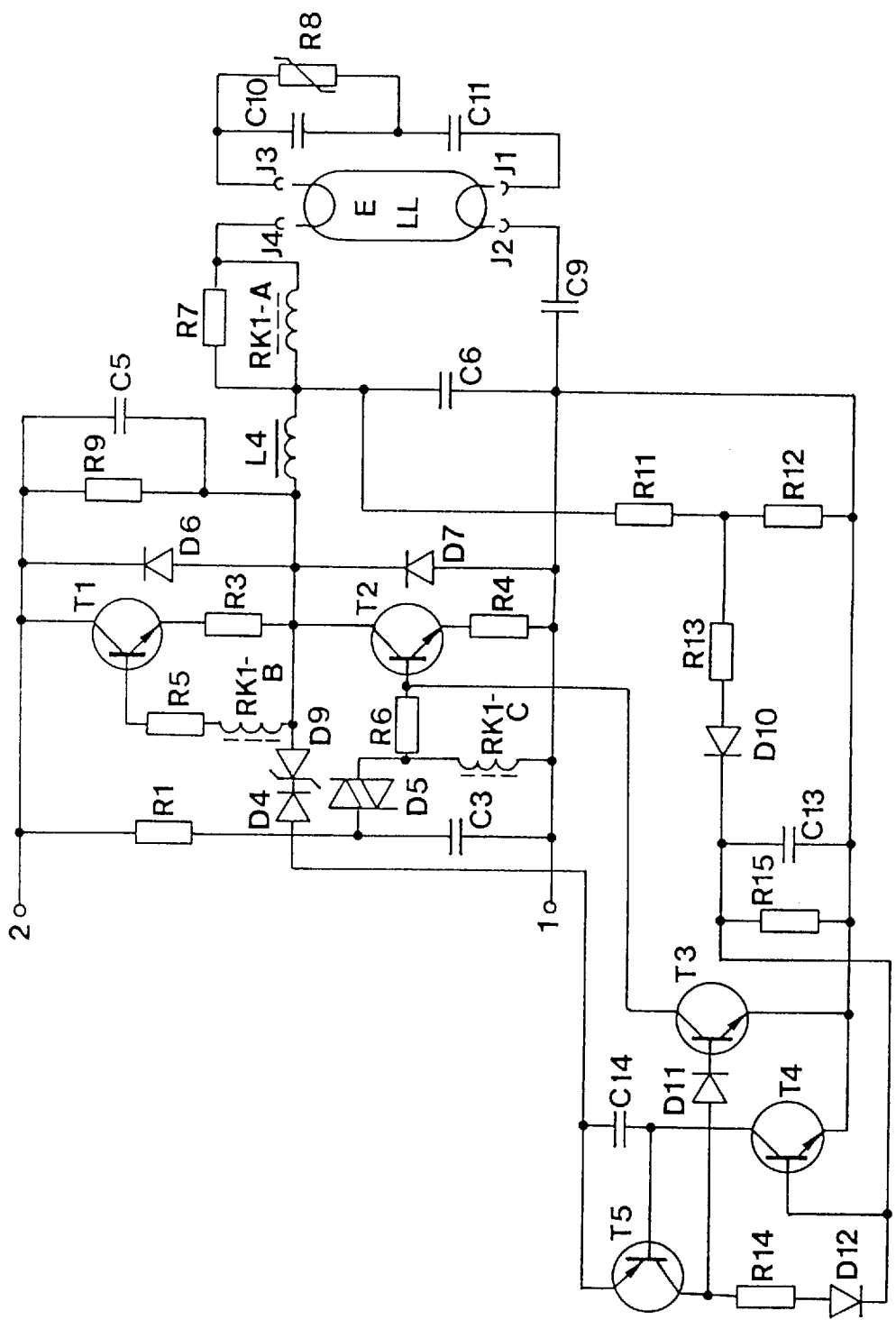
FIG. 3 shows a second sample execution of a circuit arrangement according to invention.

The circuit arrangement shown in FIG. 3 is similarly structured to the circuit arrangement shown in FIG. 2, which shows the inventive principle. The same components are labeled with the same reference symbols.

The circuit arrangement according to FIG. 3 has a not-shown power supply component at terminals 1 (ground), 2, as well as a lamp stabilization circuit with capacitors C10, C11, and a posistor R8. The half bridge has two recovery diodes D6 and D7. A resistor R9 serves to draw the center tap of the half bridge at the transistors T1 and T2 to a predetermined voltage for stimulation of oscillation in the half bridge. A capacitor C5 (a trapezoidal capacitor or "snubber") serves to reduce switching losses of the half bridge transistors.

A capacitor C6 functions as an additional resonance capacitor, which serves to increase the generator output voltage.

Via a diode D10, the lamp voltage is rectified, in order to detect peak voltages of the lamp voltage.

A capacitor C14 prevents triggering of the bistable flip-flop circuit by parasitic inductions, which may arise e.g. due to crosstalk between strip conductors of the circuit arrangement.

I claim:

1. A circuit arrangement for the operation of a discharge lamp, preferably a low-pressure discharge lamp, with a half bridge generator with an upper transistor (T1) and a lower transistor (T2), to which a voltage proportional to that of a voltage ($U_L$) across the lamp is fed via a time-lag device (R13, C13) to a base of a first transistor (T4), which forms a trigger input of a bistable flip-flop circuit consisting of the first and a second transistor (T4, T5), whereby a cutoff transistor (T3) switches the half bridge generator off when the flip-flop circuit (T4, T5) is in a conductive state, in that the cutoff transistor (T3) suppresses base drive of the lower transistor (T2) of the half bridge generator, and whereby the half bridge generator can be started by a starting capacitor (C3), which is discharged during operation of the half bridge generator via a discharge diode (D4), with the feature that the cutoff transistor (T3) has a collector-emitter path located directly between a base of the lower transistor (T2) of the half bridge generator and ground, that a diode (D12) is located between a collector of the second transistor (T5) and a base of the first transistor (T4) of the bistable flip-flop circuit, and that a diode (D11) is coupled to a base of the cutoff transistor (T3).

2. A circuit arrangement for the operation of a discharge lamp, preferably a low-pressure discharge lamp, with a half bridge generator (T1, T2), to which a voltage proportional to that of a voltage ($U_L$) across the lamp is fed via a time-lag device (R13, C13) to a base of a first transistor (T4), which forms a trigger input of a bistable flip-flop circuit consisting of a first and a second transistor (T4, T5), whereby a cutoff transistor (T3) switches the half bridge generator (T1, T2) off when the flip-flop circuit (T4, T5) is in a conductive state, in that the cutoff transistor (T3) suppresses base drive of a transistor (T2) of the half bridge generator, and whereby the half bridge generator (T1, T2) can be started by a starting capacitor (C3), which is discharged during operation of the half bridge generator via a discharge diode (D4), with the feature that the starting capacitor (C3) forms an energy source for base current of the cutoff transistor (T3), the transistor (T2) of the half bridge generator has a collector, and a Zener diode (D9) is inserted between the discharge diode (D4) and the collector of the transistor (T2) of the half bridge generator.

* * * * *